Patented May 26, 1931

1,807,183

UNITED STATES PATENT OFFICE

WILLIAM M. STRATFORD, OF PORT ARTHUR, TEXAS, ASSIGNOR, BY MESNE ASSIGNMENTS, TO THE TEXAS COMPANY, OF NEW YORK, N. Y., A CORPORATION OF DELAWARE

TREATING OILS

No Drawing.  Application filed November 24, 1924.  Serial No. 752,004.

The invention relates to a process of treating and improving petroleum oils.

The invention contemplates a process whereby lubricating oils derived from petroleum, either with or without dilution to reduce viscosity, are treated with sulfuric acid at ordinary temperatures or under the influence of heat, the sludge products coagulated and separated by mixing with the oil a comminuted solid material and the resulting acid-treated and sludge-free oil neutralized by means of an aqueous alkaline solution.

An important feature of the invention consists in following the step of neutralization or treatment of the oil with alkaline solution by subjecting the oil to the direct action of steam.

The invention is applicable to a wide range of lubricating oils. For example in refining the less viscous lubricating oil distillates to light colored products known as "pale" oils, the application of my invention produces oils much lighter in color and at the same time more stable than if the same quantity of acid were used and the treatment carried out by the usual method of manufacture, while as the result of applying my invention to such viscous stocks as cylinder oils, a better colored oil, containing less tarry and asphaltic material is obtained. In addition there are other advantages in the use of my invention which will be hereinafter more fully discussed.

It is common practice to attempt to purify and stabilize lubricating oils derived from petroleum by treating with sulfuric acid. The process of treating in general consists in charging a quantity of oil into a suitable treating vessel known as an agitator where it is mixed with concentrated sulfuric acid in predetermined proportions, mixing and agitation being effected by a stream of air admitted at the bottom of the vessel or by mechanical means. After the reaction has proceeded for the desired length of time or practically to completion, agitation is discontinued and the bulk of the acid and sludge products are allowed to settle to the bottom of the container from which they are withdrawn.

Such procedure is not satisfactory because of the fact that a considerable quantity of the sludge remains suspended in the oil in a fine state of sub-division and will not settle out under the influence of gravity. This is particularly true in the case of the more viscous oils, such as cylinder stock, in which case it is common to attempt to avoid the undesirable suspended sludge by diluting the oil before treating with a less viscous solvent, usually in the form of a lighter petroleum fraction, thus reducing the viscosity to such an extent that separation of the sludge is facilitated. However, even reducing the viscosity does not effect complete removal of sludge and the oil is not in condition for neutralization because of the fact that agitation of sludge-containing oil with alkaline solutions will result in the formation of permanent emulsions. It is therefore customary not to neutralize an oil of this type but to place the oil while in the acid condition in a still where heat is applied to drive off the volatile diluent. Reduction of the treated and diluted oil effects neutralization of the heavy cylinder oil remaining in the still, all sulfur dioxide gases being driven off with the diluent while the organic acids are decomposed to form tarry bodies which remain in the treated oil. This method of neutralizing is not advantageous because of the fact that certain tarry materials which should have been removed by the acid treatment are left in the oil and new ones are formed and the quality of the finished oil is thus lowered, and in addition the volatile acidic substances such as sulfur dioxide, resulting from the action of sulfuric acid on the hydrocarbons, cause a very rapid depreciation of the distillation equipment.

The procedure followed in common practice in treating the less viscous lubricating oils differs somewhat from that previously described for the highly viscous cylinder oils. In this case, dilution is not employed and after agitation with acid a small quantity of water is added to the mixture which has the effect of coagulating the acid and sludge particles into large lumps which rapidly settle to the bottom of the vessel. After the separation of the sludge the oil is neutralized with an alkaline solution and washed free from excess alkali. However, my experiments have shown that the addition of water to sludge products derived from the treatment of petroleum with sulfuric acid results in a hydrolysis of the sludge and the formation of oily unstable substances. Therefore, when water is added to an oil containing sludge this hydrolysis occurs and the oily products therefrom are redissolved in the oil. These hydrolysis products are highly unstable and although their exact constitution is unknown experiments have shown that their presence in a light colored oil causes a rapid increase in color while in storage. As the market value of lubricating oils may to a great extent depend upon their light color, it is obvious that a color stable product is to be desired.

I have discovered that I can materially improve the quality and stability of acid-treated lubricating oils by substantially removing the sludge products before the oil is brought in contact with water or with aqueous solutions and it is an object of the present invention to provide a means for removing sludge from acid-treated oils under such conditions that hydrolysis cannot take place.

In the application of my invention to the treating and improving of lubricating oils derived from petroleum there may be various modifications of procedure depending upon the type and character of the particular stocks and I shall therefore describe separately the treating of a comparatively light distillate oil known as "pale" oil stock and the treating of a very viscous cylinder oil.

In the first case agitation of pale oil stock with sulfuric acid is carried out in the usual manner as has already been discussed but after the reaction has continued for the required length of time, coagulation of the sludge products is effected by agitating with the oil a comminuted chemically inert solid material such as sand or clay or the like. A portion of the heavier sludge products may first be settled out by gravity but I prefer to add the pulverized solid materials to the oil immediately after the acid treatment and without any previous settling, which procedure effects a cleaner separation. The more or less dispersed particles of sludge are deposited upon and adhere to the surface of the solid material causing complete coagulation. On ceasing agitation the sludge products and solid material rapidly settle to the bottom of the vessel from which the mixture may be withdrawn as a viscous mass. The small quantity of dissolved organic acids and sulfur dioxid remaining in the sludge-free oil is neutralized by agitation with dilute aqueous alkaline solution. After neutralization it is advantageous to heat the oil and alkali, preferably with live steam, which causes complete separation of the oily and aqueous layers and prevents the possibility of emulsification. It is important that the oil should be thoroughly neutralized before heating with steam because of the fact that a light colored oil such as a pale oil will be darkened by the application of heat while the oil is in the acid condition. The treatment as described precludes any possibility of hydrolysis of sludge products while in contact with the oil and results in a finished product which is of a much better color and is more stable than had the usual processes of treating been used in its preparation.

In the application of the invention to the treatment of viscous oils, such as cylinder oils, the stock may first be diluted with a lighter petroleum fraction, such as naphtha, in order to decrease the viscosity, after which agitation with sulfuric acid takes place. It is preferable to add the acid in two or more portions or dumps because of the very heavy character of the sludge products formed in treating oils of this character. I have found that by adding only a portion of the total acid treat, say one third, and coagulating the sludge thus formed with pulverized solid material as has already been described, I will remove a large portion of the tarry constituents in the oil and thus the remaining portion of the acid, when added, is not enmeshed in the heavy sludge but is free to act upon the oil to produce the greatest possible refining action. Therefore, in applying the acid in two or more portions and coagulating sludge products after each application I am able to get more purifying effect from a given quantity of acid. Because of the fact that the treated diluted oil does not contain suspended sludge particles after coagulation with the pulverized solid material, it is possible to effect neutralization by means of aqueous alkaline solutions without the formation of emulsions and in thus neutralizing the oil I prefer to use the same procedure which I have described before in treating distillate oils; that is, to agitate with alkaline solution and then to pass steam directly into the oil. As a result, when the treated and neutralized dilute stock is subjected to distillation for removal of the diluent, no acid vapors are evolved and there is no corrosion of equipment nor is there any tar formation within the still such as would result from heating the oil to distillation temperatures while in the acid condition. Thus the process as applied to cylinder oils not only produces a better product which is more thoroughly refined but also decreases the cost of manufacture in that expensive replacement of distillation equipment is avoided.

However, as a still greater improvement in the treating of cylinder oils I have found that I can dispense with the use of a diluent entirely by carrying out the acid treatment under the influence of heat and coagulating the resulting sludge particles by means of agitation with a pulverized solid material. After coagulating and removing sludge products completely by this treatment it is possible to treat the undiluted oil with aqueous alkaline solutions to effect neutralization without the formation of permanent emulsions and it is advantageous to agitate the oil and alkaline solution by means of a current of live steam to effect a more complete separation of the two liquid layers.

Obviously many modifications and variations of the invention, as hereinbefore set forth, may be made without departing from the spirit and scope thereof, and therefore, only such limitations should be imposed as are indicated in the appended claims.

I claim:

1. The process of a treating and purifying hydrocarbon lubricating oil which comprises treating the oil with sulfuric acid, immediately without preliminary settling coagulating and separating sludge products by agitating the mixture of oil and acid with a comminuted solid material without substantially raising the temperature of the oil and neutralizing the oil by contacting with an alkaline solution.

2. The process of treating and purifying hydrocarbon lubricating oil which comprises treating the oil with sulfuric acid, immediately, without preliminary settling coagulating and separating sludge products by agitating the mixture of oil and acid with a comminuted solid material without materially raising the temperature of the oil, neutralizing the oil by mixing with an alkaline solution and passing a current of steam into the mixture.

3. The process of treating and purifying hydrocarbon lubricating oil which comprises treating the oil while under the influence of heat with sulfuric acid in a plurality of dumps, coagulating and separating sludge products after each dump without preliminary settling by agitating the mixture of oil and acid with a comminuted solid material and neutralizing the oil by contacting with an alkaline solution.

4. The process of treating and purifying hydrocarbon lubricating oil which comprises diluting the oil with a less viscous solvent, treating the dilute oil with sulfuric acid in a plurality of dumps, coagulating and separating sludge products after each dump by agitating the mixture of oil and acid with a comminuted solid material and neutralizing the oil by contacting with an alkaline solution.

5. The process of treating and purifying hydrocarbon lubricating oil which comprises agitating the oil with sulfuric acid in two portions, the first portion constituting not more than one-third of the total quantity of acid used, coagulating acid and sludge products after each acid treatment by agitating the mixture of acid and oil with a comminuted solid material, and neutralizing the oil after the second acid treatment and coagulation by mixing with an alkaline solution and passing steam into the mixture.

In witness whereof, I have hereunto set my hand this 6th day of November, 1924.

WILLIAM M. STRATFORD.